US011625754B2

(12) United States Patent
Suk et al.

(10) Patent No.: US 11,625,754 B2
(45) Date of Patent: Apr. 11, 2023

(54) METHOD FOR PROVIDING TEXT-READING BASED REWARD-TYPE ADVERTISEMENT SERVICE AND USER TERMINAL FOR EXECUTING SAME

(71) Applicant: VisualCamp Co., Ltd., Gyeonggi-do (KR)

(72) Inventors: Yun Chan Suk, Seoul (KR); Tae Hee Lee, Seoul (KR); Seung Woo Lee, Seoul (KR)

(73) Assignee: VisualCamp Co., Ltd., Seoul (KR)

( * ) Notice: Subject to any disclaimer, the term of this patent is extended or adjusted under 35 U.S.C. 154(b) by 85 days.

(21) Appl. No.: 16/770,687

(22) PCT Filed: Sep. 19, 2018

(86) PCT No.: PCT/KR2018/011062
§ 371 (c)(1),
(2) Date: Dec. 10, 2020

(87) PCT Pub. No.: WO2019/112154
PCT Pub. Date: Jun. 13, 2019

(65) Prior Publication Data
US 2021/0166271 A1 Jun. 3, 2021

(30) Foreign Application Priority Data
Dec. 7, 2017 (KR) .................. 10-2017-0167362

(51) Int. Cl.
*G06Q 30/02* (2012.01)
*G06F 3/01* (2006.01)
(Continued)

(52) U.S. Cl.
CPC ......... *G06Q 30/0262* (2013.01); *G06F 3/013* (2013.01); *G06Q 30/0242* (2013.01); *G06V 40/18* (2022.01)

(58) Field of Classification Search
CPC ...... G06Q 30/0267; H04M 1/67; G06F 3/013; G06V 40/197; A63F 13/25
See application file for complete search history.

(56) References Cited

U.S. PATENT DOCUMENTS

2005/0108092 A1\* 5/2005 Campbell .............. A61B 3/113
705/14.69
2012/0331548 A1\* 12/2012 Tseng ...................... H04M 1/67
726/19
(Continued)

FOREIGN PATENT DOCUMENTS

JP 2010-061218 A 3/2010
KR 10-1479471 B1 1/2015
(Continued)

OTHER PUBLICATIONS

Judd et al Learning to Predict Where Humans Look , (2009) IEEE 12th International Conference on Computer Vision (ICCV) (Year: 2009).\*
(Continued)

*Primary Examiner* — Saba Dagnew
(74) *Attorney, Agent, or Firm* — The PL Law Group, PLLC

(57) ABSTRACT

A user terminal according to an embodiment of the present invention includes a content providing unit for displaying a text-type advertisement content on a lock screen according to an input of a user, a gaze tracking unit for acquiring, through a photographing device, a face image of the user and a vector indicating a direction in which a face of the user faces, and tracking a gaze of the user from the face image and the vector, so as to determine whether the user has read the text-type advertisement content, and a reward providing unit for providing a set reward when it is determined that the user has read the text-type advertisement content. A text-
(Continued)

reading based reward-type advertisement service may be provided with the user terminal.

6 Claims, 15 Drawing Sheets

(51) Int. Cl.
  *G06V 40/18* (2022.01)
  *G06Q 30/0251* (2023.01)
  *G06Q 30/0242* (2023.01)

(56) References Cited

U.S. PATENT DOCUMENTS

| | | | | |
|---|---|---|---|---|
| 2014/0207559 | A1* | 7/2014 | McCord | G06Q 30/0242 705/14.41 |
| 2014/0298257 | A1* | 10/2014 | Grandhi | G06F 3/04883 715/808 |
| 2015/0085097 | A1* | 3/2015 | Larsen | H04N 5/33 348/78 |
| 2015/0338915 | A1* | 11/2015 | Publicover | G06V 40/197 345/633 |
| 2017/0109778 | A1* | 4/2017 | Lee | G06Q 20/3221 |
| 2017/0290504 | A1* | 10/2017 | Khaderi | A63F 13/25 |
| 2019/0139642 | A1* | 5/2019 | Roberge | G06F 3/013 |

FOREIGN PATENT DOCUMENTS

| | | |
|---|---|---|
| KR | 10-2015-0035631 A | 4/2015 |
| KR | 10-2015-0053843 A | 5/2015 |
| KR | 10-2015-0093013 A | 8/2015 |
| KR | 10-1737936 B1 | 5/2017 |

OTHER PUBLICATIONS

Stellmach et al Designing Gaze-supported Multimodal Interaction for the Exploration of Large Image Collection, ( May 26-27, 2011) Facility of Computer Science, University of Magdeburg, Germany (Year: 2011).*

International Search Report for PCT/KR2018/011062 dated Jan. 17, 2019.

* cited by examiner

METHOD FOR PROVIDING TEXT-READING BASED REWARD-TYPE ADVERTISEMENT SERVICE AND USER TERMINAL FOR EXECUTING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/011062, filed Sep. 19, 2018, which claims priority to the benefit of Korean Patent Application No. 10-2017-0167362 filed in the Korean Intellectual Property Office on Dec. 7, 2017, the entire contents of which are incorporated herein by reference.

TECHNICAL FIELD

The present invention relates to an eye tracking technology.

BACKGROUND ART

Eye tracking is a technology of detecting eye movements of a user and tracking a position of the eye, and methods, such as an image analysis method, a contact lens method, and a sensor attachment method, may be used. The image analysis method detects pupil movements through analysis of real-time camera images and calculates a direction of a gaze based on a fixed position reflected on a cornea. The contact lens method uses light reflected from a mirror built-in contact lens or a magnetic field from a coil built-in contact lens, which is less convenient but has high accuracy. The sensor attachment method uses a sensor attached around an eye to detect a movement of the eye using a change in the electric field according to the movement of the eye, and can detect the eye movement even when the eye is closed (for example, when sleeping).

In recent years, target devices and fields for application of the eye tracking technology are gradually expanding, and accordingly, attempts to utilize the eye tracking technology are increasing in providing advertisement services in terminals, such as smartphones. However, in order to efficiently provide an advertisement service, the accuracy of eye tracking needs to be improved, and it is necessary to efficiently configure a bidding method, a reward method, and the like according to the viewing of advertisements.

SUMMARY

Embodiments of the present invention are directed to a means for maximizing an advertising effect of advertisement content using an eye tracking technology.

According to one exemplary embodiment of the present invention, there is provided user terminal including a content providing unit configured to display a text-type advertisement content on a lock screen according to an input of a user; a gaze tracking unit configured to acquire, through a photographic device, a face image of the user and a vector representing a direction in which a face of the user is facing, and track a gaze of the user from the face image and the vector to determine whether the user has read the text-type advertisement content; and a reward providing unit configured to provide a set reward when it is determined that the user has read the text-type advertisement content.

The reward providing unit may unlock the lock screen when it is determined that the user has read the text-type advertisement content.

The content providing unit may operate the photographing device as the text-type advertisement content is displayed.

The reward providing unit may display a button for confirming the reward when it is determined that the user has read the text-type advertisement content, and may provide the reward when the user gazes at the button for a set period of time.

The reward providing unit may display a button for confirming the reward when it is determined that the user has read the text-type advertisement content, and may provide the reward when the user touches the button.

According to another exemplary embodiment of the present invention, there is provided a method of providing a text-reading based reward-type advertisement service, including displaying, at a content providing unit, a text-type advertisement content on a lock screen according to an input of a user; acquiring, at a gaze tracking unit, through a photographic device, a face image of the user and a vector representing a direction in which a face of the user is facing; tracking, at the gaze tracking unit, a gaze of the user from the face image and the vector to determine whether the user has read the text-type advertisement content; and providing, at a reward providing unit, a set reward when it is determined that the user has read the text-type advertisement content.

The method of providing a text-reading based reward-type advertisement service may further include unlocking, at the reward providing unit, the lock screen when it is determined that the user has read the text-type advertisement content.

The method of providing a text-reading based reward-type advertisement service may further include operating, at the content providing unit, the photographing device as the text-type advertisement content is displayed.

The method of providing a text-reading based reward-type advertisement service may further include displaying, at the reward providing unit, a button for confirming the reward when it is determined that the user has read the text-type advertisement content, and providing, at the reward providing unit, the reward when the user gazes at the button for a set period of time.

The method of providing a text-reading based reward-type advertisement service may further include displaying, at the reward providing unit, a button for confirming the reward when it is determined that the user has read the text-type advertisement content, and providing, at the reward providing unit, the reward when the user touches the button.

According to embodiments of the present invention, a text-type advertisement content is displayed on a lock screen, and, when it is determined, based on an eye tracking technology, that a user has read the text-type advertisement content, the lock screen is unlocked and a set reward is provided, thereby making it possible to encourage the user to pay attention to the advertisement content and accordingly to maximize the advertising effect. In addition, in this case, since it is possible to more clearly identify whether or not the user has read the advertisement content, there is an advantage in that it is easy to calculate billing according to the advertisement content.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
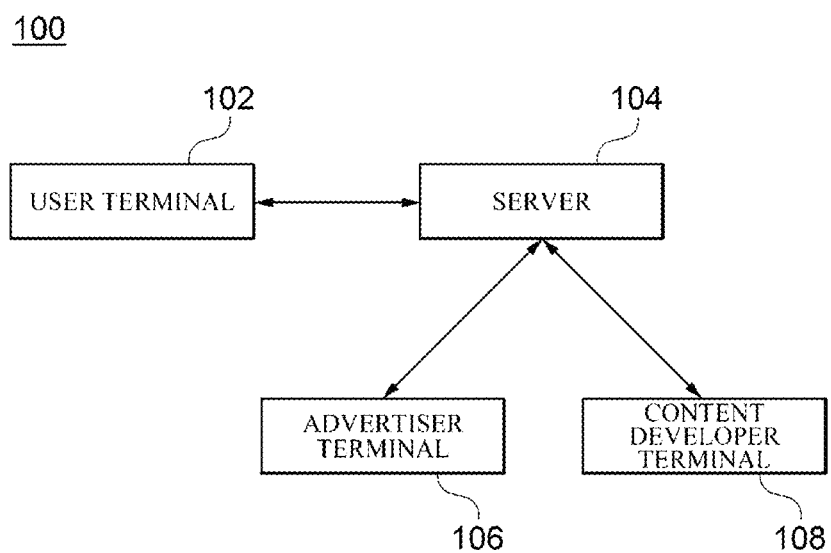
FIG. 1 is a block diagram illustrating a detailed configuration of an advertisement system according to one embodiment of the present invention.

FIG. 1 is a block diagram illustrating a detailed configuration of an advertisement system 100 according to one embodiment of the present invention. As shown in FIG. 1, the advertisement system 100 according to one embodiment of the present invention includes a user terminal 102, a server 104, an advertiser terminal 106, and a content developer terminal 108.

The user terminal 102 is a device possessed by a user and provided with various advertisement services, and may be, for example, a mobile device, such as a smartphone, a tablet PC, or a laptop computer. However, the type of the user terminal 102 is not limited thereto, and various communication devices including a screen for displaying advertisement content and a photographing device for photographing a user may correspond to the user terminal 102 according to embodiments of the present invention.

The user terminal 102 may have a screen and display advertisement content through the screen. In addition, the user terminal 102 may include a photographing device, such as a camera, a camcorder, or the like, and may track a user's gaze from a face image of the user photographed through the photographing device. Accordingly, the user terminal 102 may determine whether the user is gazing at the advertisement content on the basis of the detected user's gaze and a position of the advertisement content on the screen. At this time, the user terminal 102 may be provided with a set mobile application from the server 104 and perform the provision of the advertisement content described above, a gaze tracking function, and the like in cooperation with the screen and the photographing device in the user terminal 102 through the application.

In addition, the user terminal 102 may track a user's gaze using a set rule-based algorithm and a deep learning model. Here, the rule-based algorithm is an algorithm used to obtain various data for eye tracking using a set video processing technique, an image processing technique, a mathematical expression, or the like, and may be, for example, a face recognition algorithm (e.g., principal component analysis (PCA), linear discriminant analysis (LDA), or the like), face feature detection algorithm (e.g., support vector machine (SVM), speeded up robust features (SURF), or the like), an image-based head-tracking algorithm, a pupil extraction and pupil position coordinate calculation algorithm, or the like. In addition, the deep learning model may be, for example, a convolutional neural network (CNN) model.

The server 104 may relay various data for providing an advertisement service between the user terminal 102 and the advertiser terminal 106. As shown in FIG. 1, the server 104 may be connected to each of the user terminal 102, the advertiser terminal 106, and the content developer terminal 108 through a network (not shown). The server 104 may provide the user terminal 102 with a mobile application for providing an advertisement service according to a request of the user terminal 102. The user terminal 102 may access the server 104 through the mobile application and provide the user with various advertisement services provided by the server 104. In addition, the server 104 may receive the advertisement content from the content developer terminal 108 in cooperation with the advertiser terminal 106 and provide the advertisement content to the user terminal 102. Thereafter, the server 104 may collect various data (e.g., the time and number of times of displaying each advertisement content, the time and number of times of viewing each advertisement content, and the like) for measuring an advertising effect of the advertisement content from the user terminal 102, and provide the collected data to the advertiser terminal 106.

The advertiser terminal 106 is a terminal possessed by an advertiser and may be connected to the server 104 through the network. The advertiser terminal 106 may receive at least one advertisement content selected by the advertiser from a plurality of advertisement contents provided by the content developer terminal 108 and provide information regarding the selected advertisement content to the server 104. In addition, the advertiser terminal 106 may be provided with various data related to the advertising effect of the advertisement content from the server 104.

The content developer terminal 108 is a terminal possessed by a developer who develops advertisement contents, and may be connected to the server 104 through the network. The content developer terminal 108 may provide the advertisement content produced/edited by the content developer to the advertiser terminal 106 through the server 104. The server 104 may receive information on the advertisement content selected by the advertiser from the advertiser terminal 106 and provide an advertisement content corresponding to the information to the user terminal 102.

Figure 2:
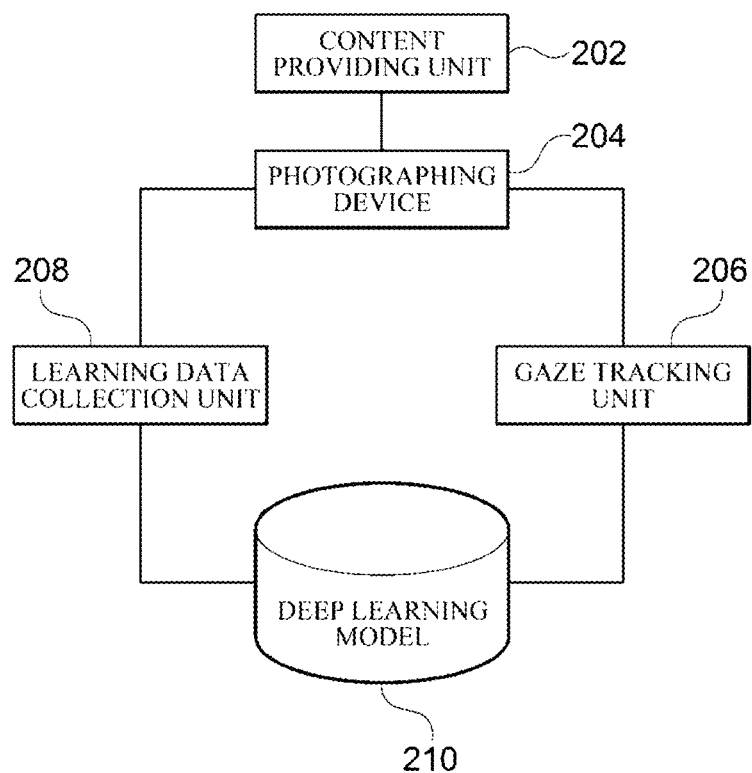
FIG. 2 is a block diagram illustrating a detailed configuration of a user terminal according to one embodiment of the present invention.

FIG. 2 is a block diagram illustrating a detailed configuration of the user terminal 102 according to one embodiment of the present invention. As shown in FIG. 2, the user terminal 102 according to one embodiment of the present invention includes a content providing unit 202, a photographing device 204, a gaze tracking unit 206, and a learning data collection unit 208.

The content providing unit 202 displays an advertisement content on a screen of the user terminal 102. In one example, the content providing unit 202 may display the advertisement content on a lock screen. The lock screen may be a screen displayed when, for example, a user presses a specific button (e.g., a home button) in the user terminal 102 in a state where the user terminal 102 is switched to lock mode. The content providing unit 202 may display the advertisement content in the form of text, image, or video on the lock screen. In another example, when an execution command for an application, a menu, or the like set by the user is received, the content providing unit 202 may display the advertisement content on the screen according to the execution command. However, the examples of the screen on which the advertisement content is displayed are not limited thereto, and the advertisement content may be displayed on a screen of various preset forms.

The photographing device 204 is a device that photographs a user gazing at the screen of the user terminal 102, and may be, for example, a camera or a camcorder. The photographing device 204 may be provided on, for example, a front surface of the user terminal 102. The user terminal 102 may acquire a user's face image through the photographing device 204 and track the user's gaze through the face image.

The gaze tracking unit 206 tracks a user's gaze. The gaze tracking unit 206 may track the user's gaze using a set rule-based algorithm and a deep learning model 210. In the present embodiments, the deep learning model 210 is a type of artificial neural network (ANN) using a human neural network theory, and means a set of machine learning models or algorithms that refer to a deep neural network (DNN) configured in a layer structure having one or more hidden layers between an input layer and an output layer. In this case, the gaze tracking unit 206 may track the user's gaze in cooperation with the photographing device 204.

In one example, when the user's face is detected by the photographing device 204, the gaze tracking unit 206 may track the user's gaze using the rule-based algorithm and the deep learning model 210 described above. In another example, when the user's face is not detected in the photographing device 204, the gaze tracking unit 206 may operate in sleep mode to stop various operations for the gaze tracking.

If the user's face is detected in the photographing device 204, the gaze tracking unit 206 may acquire the user's face image photographed through the photographing device 204, and acquire vector representing the direction of the user's face and the user's pupil image from the face image on the basis of set rules. Thereafter, the gaze tracking unit 206 may track the user's gaze by inputting the face image, the vector, and the pupil image to the deep learning model 210. Here, it is assumed that the deep learning model 210 has been already trained with a sufficient amount of learning data collected by the learning data collection unit 208. In addition, the gaze tracking unit 206 may acquire pupil position coordinates of the user, a face position coordinates, a direction vector of the pupil, and the like from the face image on the basis of the rules, and input the acquired data to the deep learning model 210. As described above, the gaze tracking unit 206 may further improve the accuracy of eye tracking by inputting various quantitative data for eye tracking obtained based on rules, as well as images of the user's face and pupil, to the deep learning model 210.

Furthermore, the gaze tracking unit 206 may determine whether the user is gazing at the advertisement content, on the basis of the detected user's gaze and the position of the advertisement content on the screen. As will be described below, the content providing unit 202 may change the position of the advertisement content in the screen by taking into consideration the position of the advertisement content in the screen and the time for which the user gazes at the advertisement content.

Figure 3:
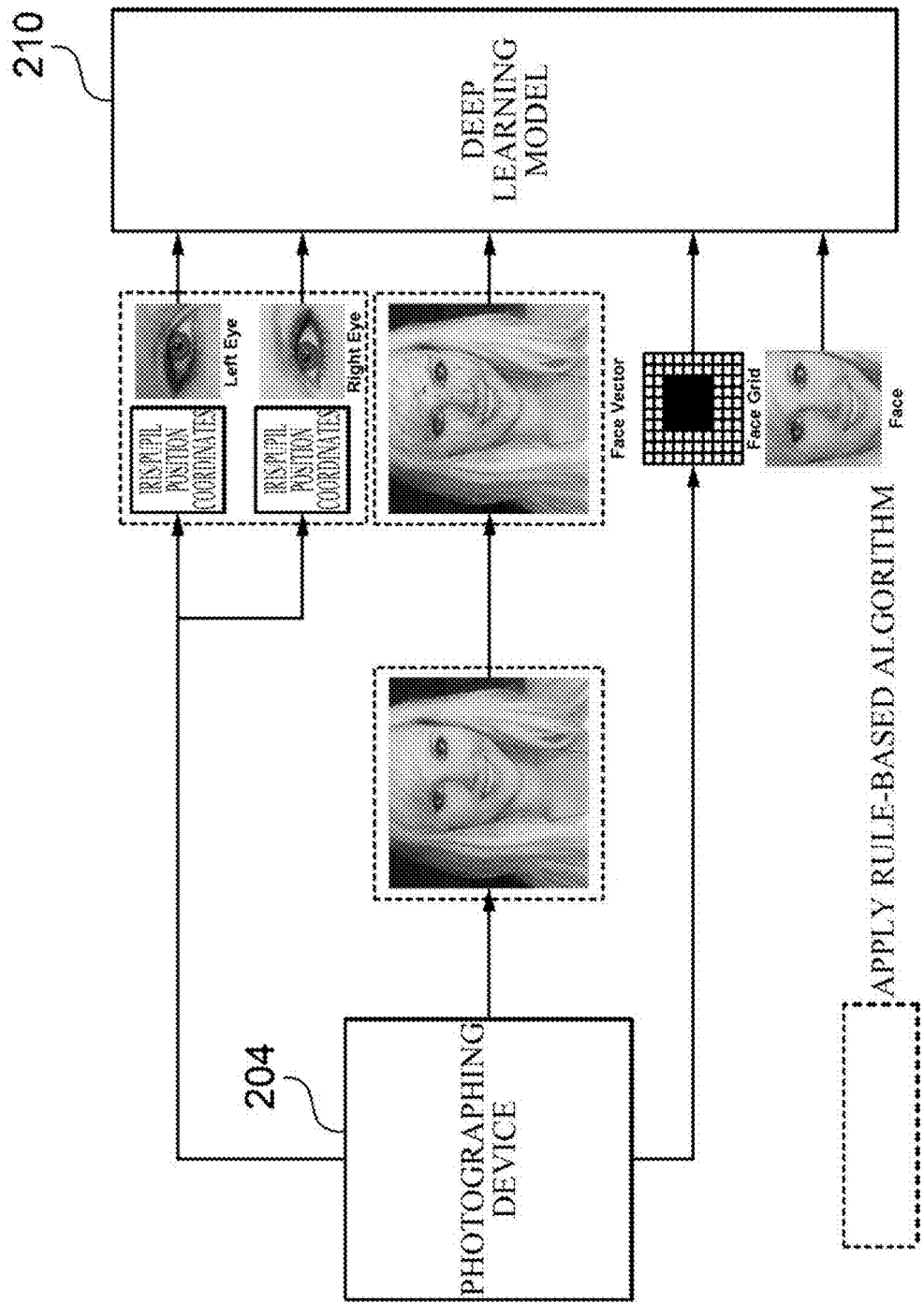
FIG. 3 is a diagram for describing a process of inputting various data for eye tracking to a deep learning model by a gaze tracking unit according to one embodiment of the present invention.
Figure 4:
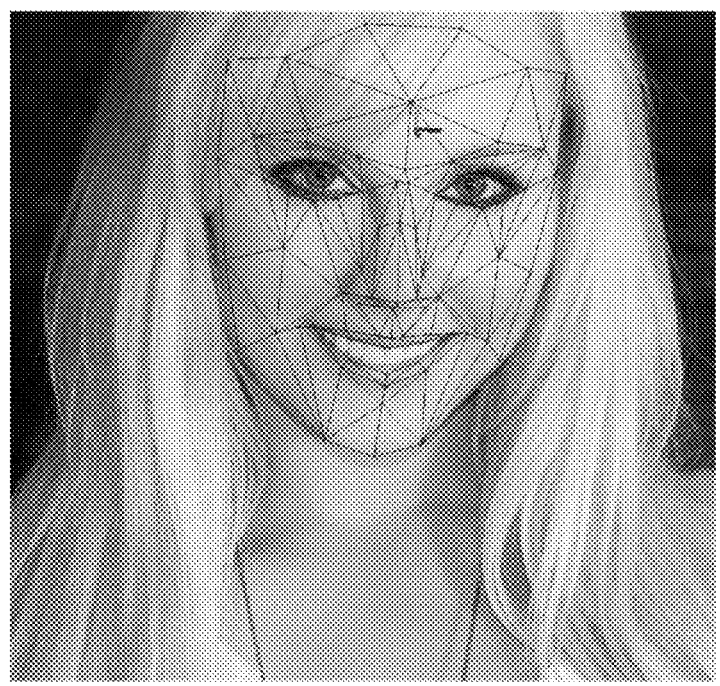
FIG. 4 illustrates an example of a face-vector according to one embodiment of the present invention.

FIG. 3 is a diagram for describing a process of inputting various data for eye tracking to the deep learning model 210 by the gaze tracking unit 206 according to one embodiment of the present invention, and FIG. 4 illustrates an example of a face-vector according to one embodiment of the present invention. In addition, FIG. 5 illustrates an example of a process of tracking a user's gaze through the deep learning model 210 according to one embodiment of the present invention.

Referring to FIG. 3, the gaze tracking unit 206 may acquire a vector representing a direction in which a face of the user is facing, a pupil image, pupil position coordinates, and the like by applying the rule-based algorithm to the user's face image acquired through the photographing device 204. In general, when the user gazes at a specific point, the face of the user is directed to the specific point, and thus the direction in which the user's face is facing is highly likely to match the direction of the user's gaze. Accordingly, in embodiments of the present invention, the accuracy of eye tracking may be further improved by using a vector representing the direction in which the face of the user is facing, as well as the user's face image and the pupil image, as input data of the deep learning model 210. The gaze tracking unit 206 may extract a feature vector of the face image through, for example, a set feature point extraction algorithm, and acquire the vector representing the direction in which the user's face is facing, that is, the face-vector, from the feature vector. An example of the face-vector acquired as described above is shown in FIG. 4. Also, the gaze tracking unit 206 may detect an eye region from the face image through an image processing technique, and acquire an image of the eye region (i.e., a pupil image) and position coordinates of an iris or a pupil. In addition, the gaze tracking unit 206 may detect a face region of the user from the entire screen and the acquire position coordinates of the face region. The gaze tracking unit 206 may input the vector, pupil image/position coordinates, face image/position coordinates, and the like, which are acquired as described above, to the deep learning model 210. The input data described above may be utilized as elements for tracking the user's gaze in the deep learning model 210.

Figure 5:
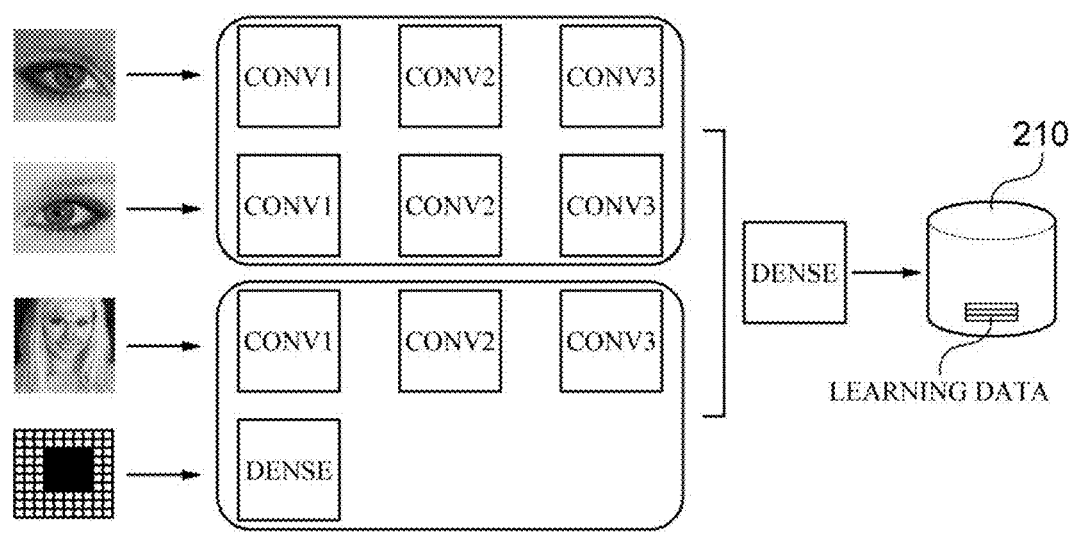
FIG. 5 illustrates an example of a process of tracking a user's gaze through a deep learning model in the gaze tracking unit according to one embodiment of the present invention.

Referring to FIG. 5, the deep learning model 210 may include a plurality of layers in a layer structure and the above-described input data may be input to the layers. The deep learning model 210 may track the user's gaze on the basis of pre-trained learning data and newly received input data.

Meanwhile, in order for the gaze tracking unit 206 to more accurately track the user's gaze using the deep learning model 210, high reliability of the learning data of the deep learning model 210, that is, the learning data for eye tracking, is necessary.

To this end, referring back to FIG. 2, the learning data collection unit 208 may collect a large amount of learning data to be used in training the deep learning model 210, on the basis of actions of a viewer. Specifically, when a set action is received from a viewer who is gazing at a set point in the screen of the user terminal 102, the learning data collection unit 208 may collect learning data that includes the viewer's face image photographed through the photographing device 204 at the time of receiving the input of the action and position information of the set point. The learning data collection unit 208 may extract a vector representing the direction in which the viewer's face is facing, the viewer's pupil image/position coordinates/vector, face position coordinates, and the like from the viewer's face image and train the deep learning model 210 with the extracted data along with the position information of the set point. Here, the position information of the set point may be utilized as information indicating that the viewer is currently gazing at the corresponding point (i.e., gaze information of the viewer). The learning data collection unit 208 may collect the learning data at a set interval, train the deep learning model 210 with the learning data, and repeat this process to continuously update the deep learning model 210. In addition, the action may be, for example, viewer's screen touch, a vocal utterance of the viewer, or the like, and an embodiment of the collection of the learning data is as follows.

Embodiment

When the viewer's touch input on a pattern for unlocking a lock screen is received, the photographing device 204 operates to photograph the face of the viewer at the time when the viewer's touch input is first made→the photographed face image of the viewer (or the face image/position coordinates, a vector indicating the direction in which the viewer's face is facing, the viewer's pupil image/position coordinates, etc.) and position information of the point where the pattern is first touched are collected as learning data.

When the viewer touches (or clicks) an application icon or menu button set on the screen, the photographing device 204 operates to photograph the face of the viewer at the time when the viewer's touch input is made→the photographed face image of the viewer (or the face image/position coordinates, a vector indicating the direction in which the viewer's face is facing, the viewer's pupil image/position coordinates, etc.) and position information of the touched application icon or menu button are collected as learning data.

When a single point is displayed on the screen to induce the viewer to touch it and the viewer touches the point, the photographing device 204 operates to photograph the face of the viewer at the time when the viewer's touch input is made→the photographed viewer's face image (or the face image/position coordinates, a vector indicating the direction in which the viewer's face is facing, the viewer's pupil image/position coordinates, etc.) and position information of the touched point are collected as learning data.

The learning data collected as described above may be input to the deep learning model 210 and learned. Specifically, the gaze tracking unit 206 may train the deep learning model 210 with the learning data and track the user's gaze using the deep learning model 210 trained with the learning data. Hereinafter, a method of collecting the learning data by the learning data collection unit 208 will be described in more detail with reference to FIGS. 6 to 9.

Figure 6:
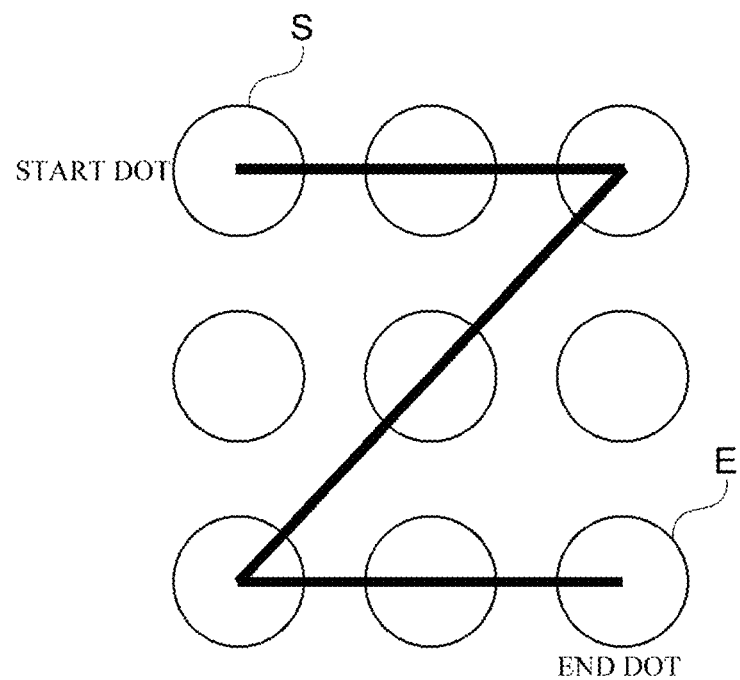
FIG. 6 illustrates an example for describing a process of collecting learning data input to a deep learning model in a learning data collection unit according to one embodiment of the present invention.

FIG. 6 illustrates an example for describing a process of collecting learning data to be input to the deep learning model 210 by the learning data collection unit 208 according to one embodiment of the present invention.

referring to FIG. 6, the learning data collection unit 208 may display nine dots for pattern input on a lock screen. Accordingly, the viewer may perform a touch input on a z-shaped pattern predefined for unlocking the lock screen. In this case, the viewer may perform the touch input on the z-shaped pattern starting from start dot S to end dot E. The learning data collection unit 208 may collect learning data that includes the viewer's face image photographed through the photographing device 204 at the time when the viewer's touch input is first made, that is, when the viewer touches the start dot S, and position information of the start dot S.

Figure 7:
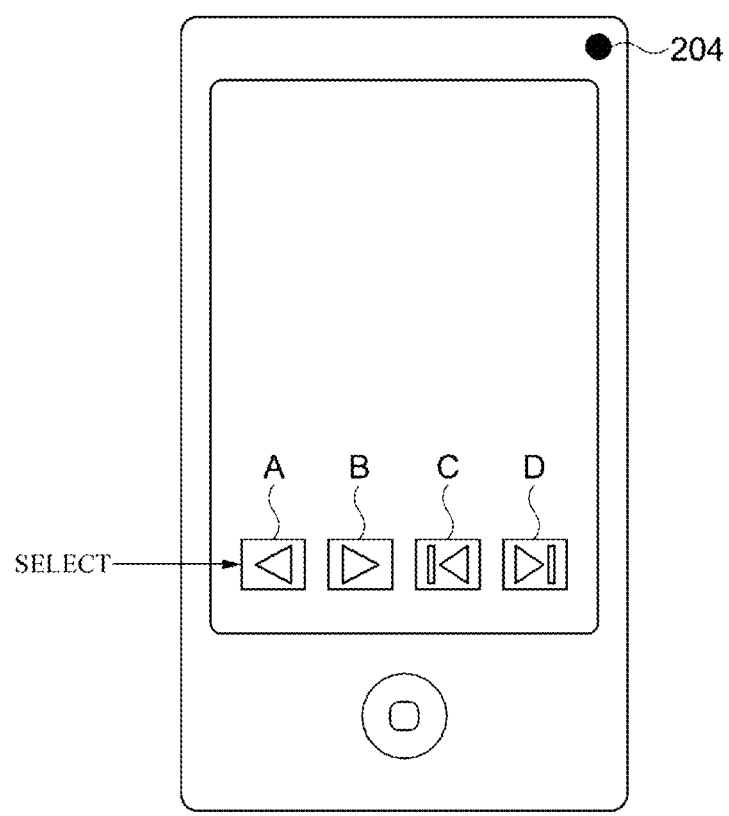
FIG. 7 illustrates another example for describing a process of collecting learning data input to the deep learning model in the learning data collection unit according to one embodiment of the present invention.
Figure 8:
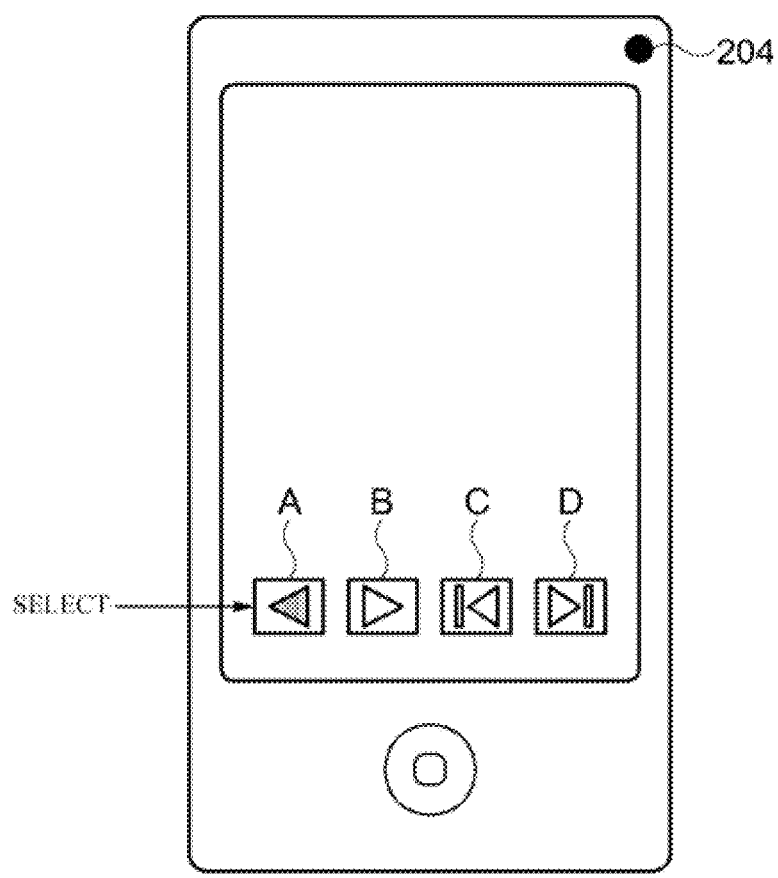
FIG. 8 illustrates an example for describing a process of changing visual elements of a set point when a viewer touches the set point in FIG. 7.

FIG. 7 illustrates another example for describing a process of collecting learning data to be input to the deep learning model 210 by the learning data collection unit 208 according to one embodiment of the present invention, and FIG. 8 illustrates an example for describing a process of changing visual elements of a set point when the viewer touches the set point in FIG. 7.

Referring to FIG. 7, the learning data collection unit 208 includes buttons A (back button), button B (forward button), button C (start button), and button D (end button) on the screen. If the viewer touches the button A, the learning data collection unit 208 may collect learning data that includes the viewer's face image photographed through the photographing device 204 at the time when the viewer's touch input is made, that is, when the viewer touches the button A, and position information of the button A.

Also, the learning data collection unit 208 may change visual elements of the point after the viewer touches the point, so that the viewer's gaze remains at the touched point even after the touch. Here, the visual element is an element necessary for recognizing objects output on the screen with eyes, and may be, for example, the size, shape, color, brightness, texture, and the like of the object output on the screen, a region including the object, or a border line of the object.

Referring to FIG. 8, when the viewer touches the button A, the learning data collection unit 208 may cause the color of button A to appear darker, so that the viewer's gaze may be induced to remain at the button A even after the touch.

Meanwhile, the learning data collection unit 208 may collect the learning data by operating the photographing device 204 at the time when the viewer touches the set point. That is, the photographing device 204 may remain in OFF-state at normal times, and be operated by the learning data collection unit 208 at the time when the viewer touches the set point, thereby photographing the user, and accordingly it is possible to prevent the battery consumption of the user terminal 102 from being wasted due to continuous operation of the photographing device 204. In addition, the learning data collection unit 208 may transmit the viewer's face image photographed at the time when the viewer touches the point and the position information of the point (i.e., the learning data collected at the time of touching the point) to the server 104, and accordingly, the server 104 may collect and analyze the learning data. The server 104 may collect the learning data from the user terminal 102 and store the learning data in a database (not shown), and perform an analysis process (e.g., extraction of a face-vector, pupil image/position coordinates, face image/position coordinates, and the like) executed by the user terminal 102.

In addition, when the viewer touches the set point while the photographing device 204 is operating, the learning data collection unit 208 may collect the learning data individually at the time when the touch is made and at a set time before and after the touch is made (e.g., one second before the touch is made and one second after the touch is made). In general, when a viewer wants to touch a specific point, the viewer gazes at the corresponding point immediately before and immediately after the touch, and hence, not only the learning data collected at the exact time of the touch but also the learning data collected at the time just before and immediately after the touch may be considered to have high reliability. That is, according to embodiments of the present invention, when the viewer touches a set point while the photographing device 204 is operating, learning data is individually collected at the time when the touch is made and at a set time before and after the touch is made, thereby more easily collecting a large amount of highly reliable learning data.

Figure 9:
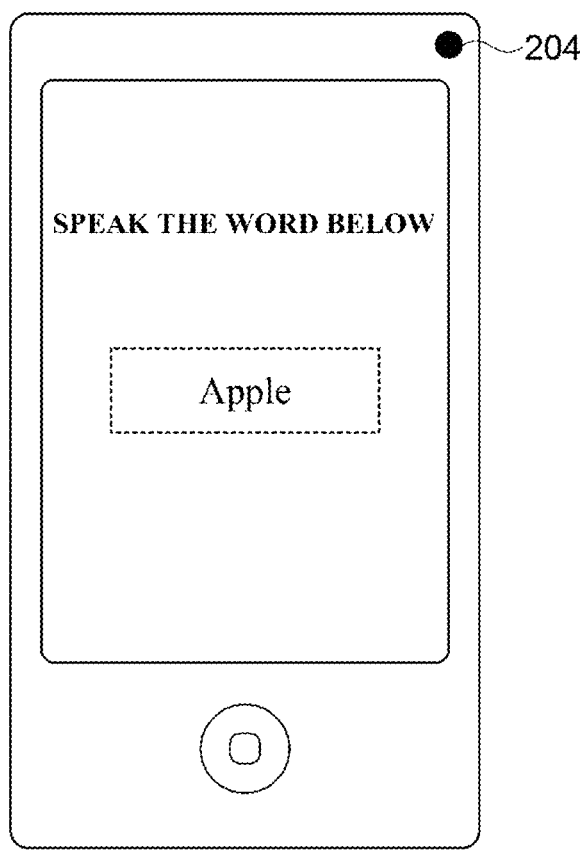
FIG. 9 illustrates another example for describing a process of collecting learning data input to the deep learning model in the learning data collection unit according to one embodiment of the present invention.

FIG. 9 illustrates another example for describing a process of collecting learning data to be input to the deep learning model 210 by the learning data collection unit 208 according to one embodiment of the present invention.

Referring to FIG. 9, the learning data collection unit 208 may display a phrase set at a specific point, and, when the viewer utters a voice in response to the phrase, the learning data collection unit 208 may collect learning data including the viewer's face image, which is photographed through the photographing device 204 at the time when the utterance starts, and position information of the point. In one example, when the learning data collection unit 208 displays the phrases "speak the word below" and "Apple" on the upper and center portions of the screen, respectively, and accordingly the viewer utters a voice to read along the "Apple," the learning data collection unit 208 may collect learning data including the viewer's face image photographed through the photographing device 204 at the time when the utterance starts and the position information of the point at which the phrase "Apple" is displayed.

As described above, according to embodiments of the present invention, when an action, such as a touch or a voice, is input from the viewer who is gazing at a set point in the screen, the viewer's face image, which is photographed at the time of receiving the action, and position information of the point may be used as learning data of the deep learning model 210 for eye tracking, thereby making it possible to further improve the accuracy and reliability of eyes tracking.

Figure 10:
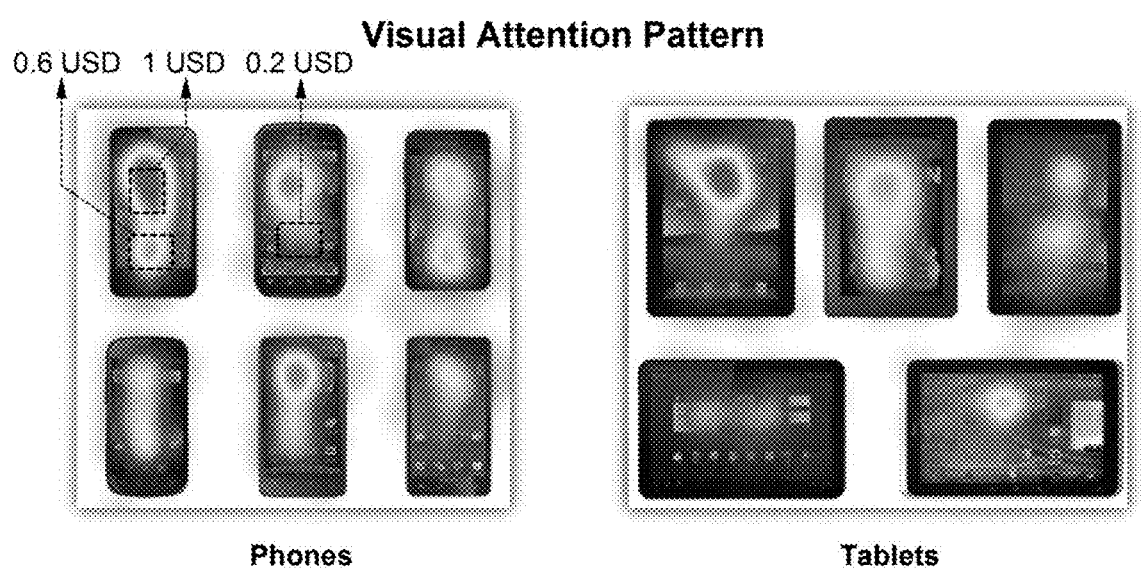
FIG. 10 illustrates an example for describing a gaze-based beading method according to one embodiment of the present invention.

FIG. 10 illustrates an example for describing a base-based bidding method according to one embodiment of the present invention. The gaze tracking unit 206 may compare a detected gaze of the user and a position of the advertisement content in the screen and determine whether or not the user is gazing at the advertisement content, and accordingly it may be determined at which position in the screen the user has gazed more at the advertisement content. The gaze tracking unit 206 may calculate the time and number of times the user gazes at the advertisement content for each region, and provide the calculation results to the server 104. Accordingly, the server 104 may interwork with the advertiser terminal 106 to change bidding of the advertisement content for each region at which the corresponding advertisement content is positioned.

Referring to FIG. 10, the server 104 may bid $1 for the advertisement content in the region which the user has relatively more gazed at, and $0.6 for the advertisement content in the region which the user has relatively less gazed at, and may bill the advertiser terminal 106.

In addition, the content providing unit 202 may change the position of the advertisement content in the screen by taking into consideration the position of the advertisement content in the screen and the time for which the user has gazed at the advertisement content. For example, the content providing unit 202 may identify a region which has been gazed at a set number of times or more or for a set time or longer from among a plurality of regions where the advertisement content has been displayed, and may change the position of the advertisement content currently being displayed to the identified region, which has been gazed at the set number of times or more or for the set time or longer. Accordingly, it is possible to induce the user to gaze more at the advertisement content.

Figure 11:
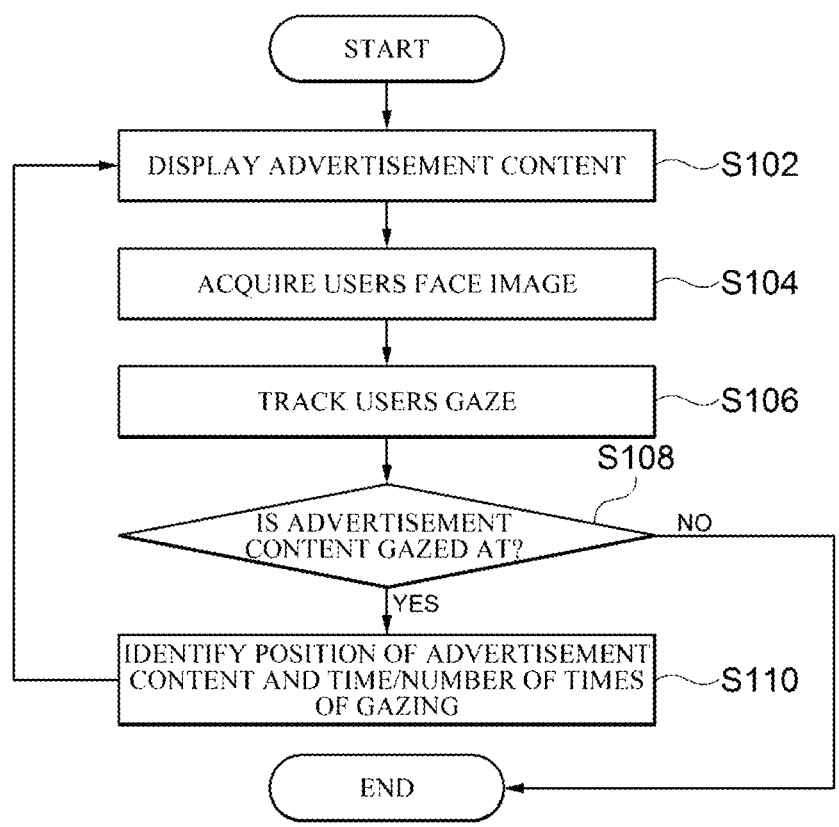
FIG. 11 is a flowchart for describing an eye tracking method according to one embodiment of the present invention.

FIG. 11 is a flowchart for describing a method of eye tracking according to one embodiment of the present invention. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In step S102, a content providing unit 202 displays an advertisement content on a screen.

In step S104, a gaze tracking unit 206 acquires a user's face image through a photographing device 204.

In step S106, the gaze tracking unit 206 tracks a gaze of the user using a set rule-based algorithm and a deep learning model. A method of the gaze tracking unit 206 to track the user's gaze using the rule-based algorithm and the deep learning model has been described above in detail, and thus the detailed description thereof will be omitted hereinafter.

In step S108, the gaze tracking unit 206 determines whether the user is gazing at the advertisement content on the basis of the detected user's gaze and the position of the advertisement content in the screen.

In step S110, when it is determined that the user is gazing at the advertisement content, the gaze tracking unit 206 identifies the position of the advertisement content in the screen and the time/number of times the viewer gazes the advertisement content.

Figure 12:
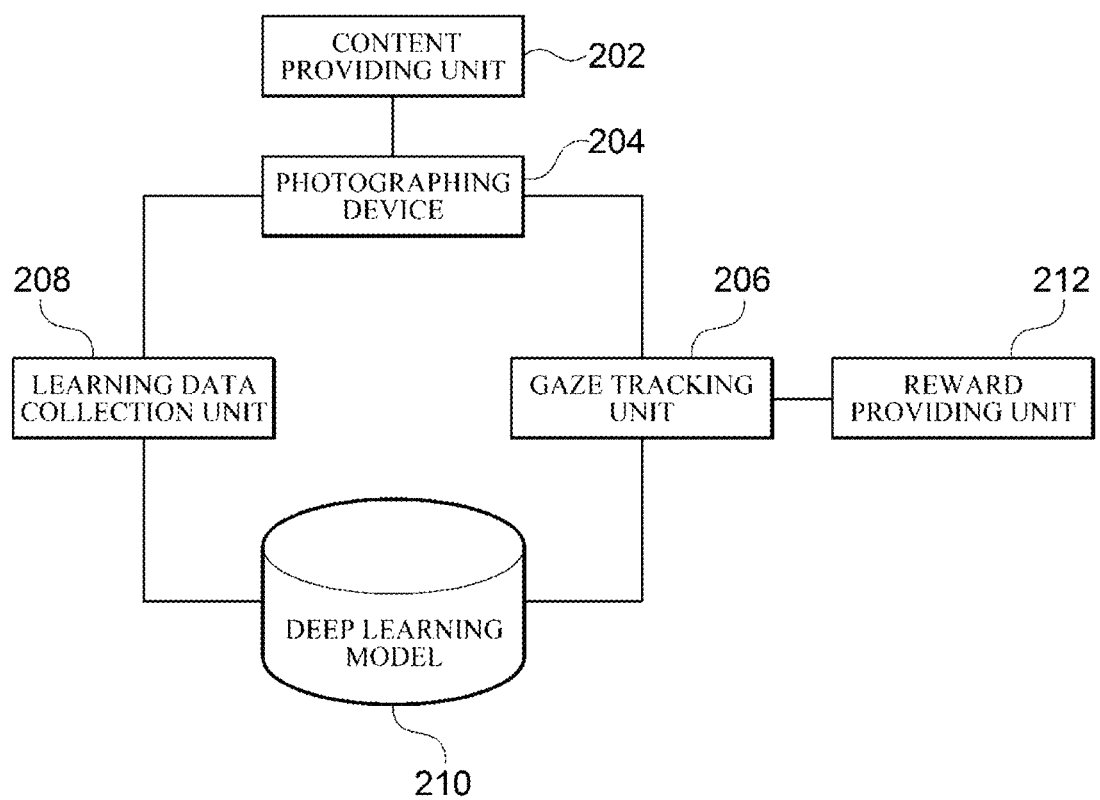
FIG. 12 is a block diagram illustrating a detailed configuration of a user terminal according to another embodiment of the present invention.

FIG. 12 is a block diagram illustrating a detailed configuration of a user terminal 102 according to another embodiment of the present invention. Elements corresponding to the elements in one embodiment of the present invention described with reference to FIG. 2 perform the same or similar functions as described above, and hence detailed descriptions thereof will be omitted.

Referring to FIG. 12, the user terminal 102 includes a content providing unit 202, a photographing device 204, a gaze tracking unit 206, a learning data collection unit 208, and a reward providing unit 212. Here, the content providing unit 202, the photographing device 204, the gaze tracking unit 206, and the learning data collection unit 208 have been described above in detail, and thus a description related to the embodiment to be described below will be given hereinafter.

The content providing unit 202 displays a text-type advertisement content on a lock screen according to a user's input. For example, when the user presses a specific button of the user terminal 102 in lock mode or touches the screen of the user terminal 102, the content providing unit 202 may display a text-type advertisement content on the lock screen. In this case, as the text-type advertisement content is displayed, the content providing unit 202 may operate the photographing device 204. That is, the photographing device 204 may remain in OFF-state at normal times, and be operated by the content providing unit 202 at the time when the content providing unit 202 displays the text-type advertisement content on the screen, thereby photographing the user, and accordingly, it is possible to prevent the battery consumption of the user terminal 102 from being wasted due to continuous operation of the photographing device 204.

The gaze tracking unit 206 acquires a user's face image through the photographing device 204, and tracks the user's gaze from the face image to determine whether the user has read the text-type advertisement content. As described above, the gaze tracking unit 206 may track the user's gaze using a rule-based algorithm and a deep learning model 210, and whether the user has read the text-type advertisement content may be determined from the detected gaze.

The reward providing unit 212 may provide a set reward when it is determined that the user has read the text-type advertisement content. Here, the reward may be, for example, a cyber point, cash deposit, issuance of a set coupon, product delivery, or the like, but the example of the reward is not limited thereto.

In addition, when it is determined that the user has read the text-type advertisement content, the reward providing unit 212 may display a button for confirming the reward, and may provide the reward when the user gazes at the button for a set period of time. In addition, when it is determined that the user has read the text-type advertisement content, the reward providing unit 212 may display a button for confirming the reward, and may provide the reward when the user touches the button.

Also, when it is determined that the user has read the text-type advertisement content, the reward providing unit 212 may allow the user to use the user terminal 102 normally by unlocking the lock screen. In this case, the reward providing unit 212 may unlock the lock screen when the user gazes at or touches the button for confirming the reward for a set period of time.

Figure 13:
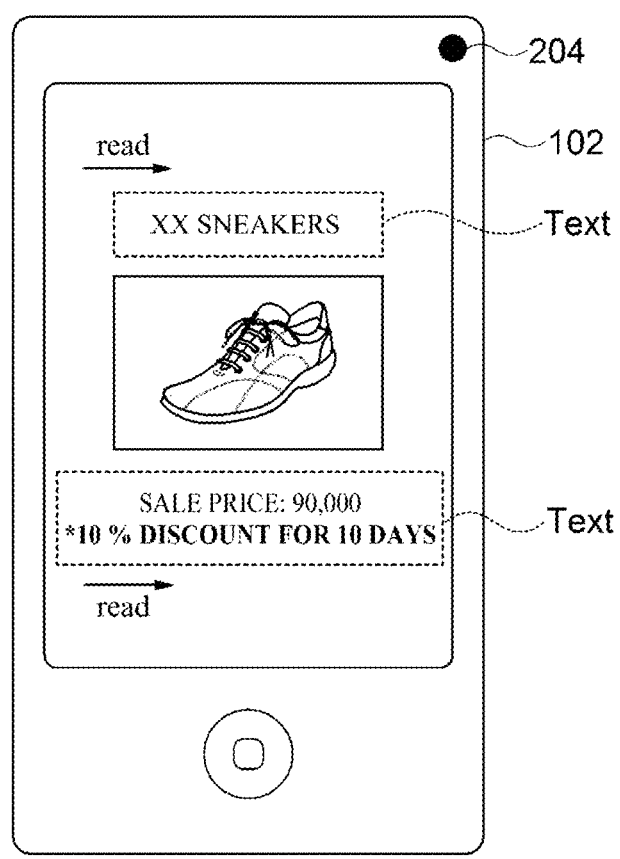
FIG. 13 illustrates an example for describing a process of displaying a text-type advertisement content on a lock screen by a content providing unit according to one embodiment of the present invention.

FIG. 13 illustrates an example for describing a process of displaying a text-type advertisement content on a lock screen by the content providing unit 202 according to one embodiment of the present invention.

Referring to FIG. 13, the content providing unit 202 may display an advertisement content including text on the lock screen. In the example of FIG. 12, the content providing unit 202 may display an advertisement content including text, such as "XX sneakers," "Sale price: 90,000," "10% discount for 10 days," etc., on the lock screen.

The user may sequentially read the text along a direction of an arrow shown in FIG. 13, and the gaze tracking unit 206 may analyze the face image of the user photographed by the photographing device 204 in real time, thereby determining whether the user has read all the text.

If it is determined that the user has read the text-type advertisement content, the reward providing unit 212 may unlock the lock screen.

In addition, when it is determined that the user has read the text-type advertisement content, the reward providing unit 212 may display a button for confirming the reward.

Figure 14:
FIG. 14 illustrates an example for describing a process of displaying a button for confirming a reward by a reward providing unit according to one embodiment of the present invention.

FIG. 14 illustrates an example for describing a process of displaying a button for confirming a reward by the reward providing unit 212 according to one embodiment of the present invention. As described above, when it is determined that the user has read the text-type advertisement content, the reward providing unit 212 may display a button R for confirming the reward.

In one example, when the user gazes at the button R for a set period of time, the reward providing unit 212 may provide the reward. In another example, when the user touches the button R, the reward providing unit 212 may provide the reward. As such, when it is determined that the user has read the text-type advertisement content, the reward providing unit 212 may display the button R for confirming the reward and induce the user to stare at or touch the button, thereby additionally acquire learning data for eye tracking. The photographing device 204 may photograph the face image of the user while the user is gazing at or touching the button R, and the learning data collection unit 208 may collect learning data which includes the user's face image photographed at this point in time and position information of the button.

Figure 15:
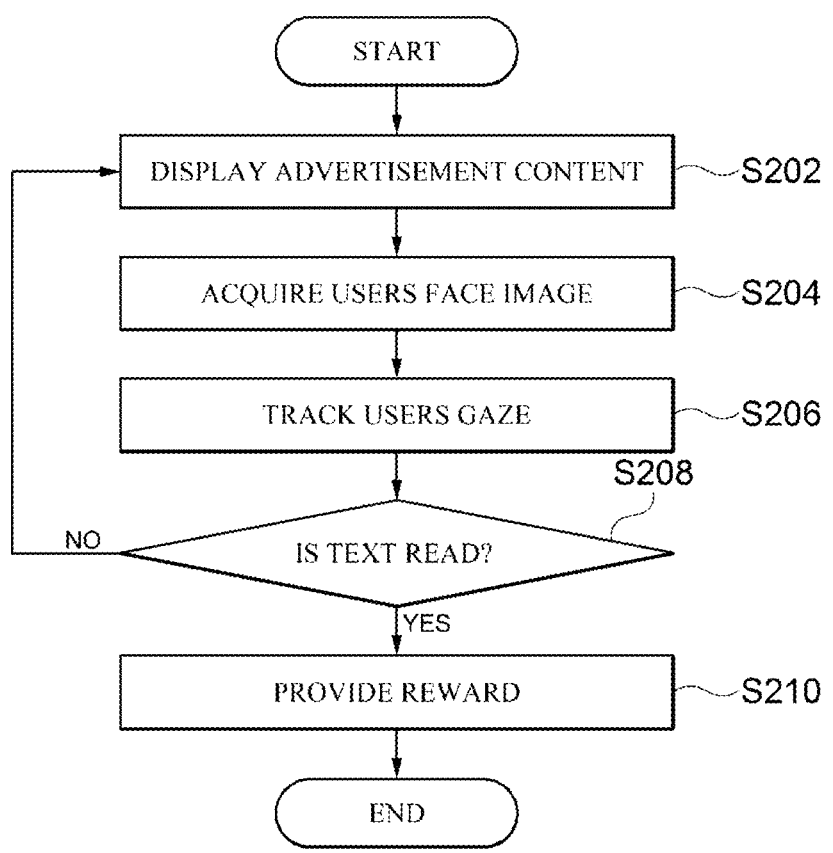
FIG. 15 is a flowchart for describing a method of providing a text-reading based reward-type advertisement service according to one embodiment of the present invention.

FIG. 15 is a flowchart for describing a method of providing a text-reading based reward-type advertisement service according to one embodiment of the present invention. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In step S202, a content providing unit 202 displays a text-type advertisement content on the lock screen according to a user's input.

In step S204, a gaze tracking unit 206 acquires a user's face image through a photographing device 204.

In step S206, the gaze tracking unit 206 tracks a user's gaze using a set rule-based algorithm and a deep learning model.

In step S208, the gaze tracking unit 206 determines whether the user has read the text-type advertisement content.

In step S210, when it is determined that the user has read the text-type advertisement content, a reward providing unit 212 provides a set reward.

As described above, according to the embodiments of the present invention, the text-type advertisement content is displayed on the lock screen, and when it is determined, based on an eye tracking technology, that the user has read the text-type advertisement content, the lock screen is unlocked and the set reward is provided, so that it is possible to induce the user to gaze at the advertisement content and accordingly to maximize an advertising effect. In addition, in this case, since it is possible to more clearly identify whether or not the user has read the advertisement content, there is an advantage in that it is easy to calculate billing according to the advertisement content.

Figure 16:
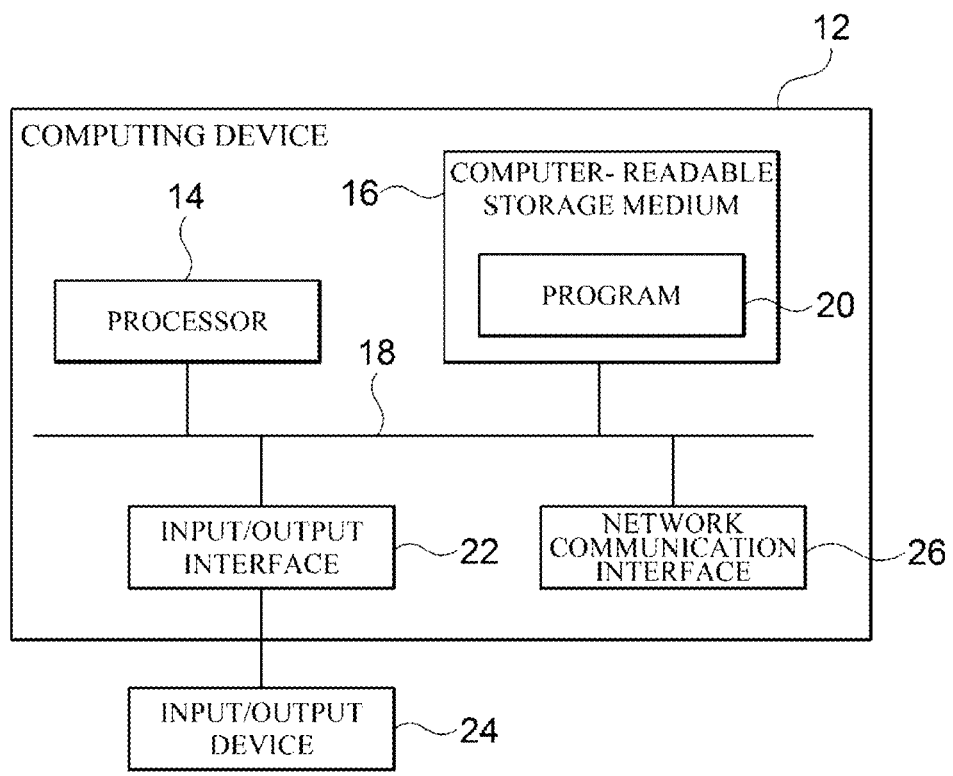
FIG. 16 is a block diagram illustrating a computing environment including a computing device suitable for use in exemplary embodiments.

FIG. 16 is a block diagram for describing a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be an advertisement system, or one or more components included in a user terminal 102.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12, including the processor 14 and the computer-readable storage medium 16.

The computing device 12 may also include one or more input/output interfaces 22 for providing an interface for one or more input/output devices 24 and one or more network communication interfaces 26. The input/output interface 22 may include the above-described scroll screen 102, an input interface 104, an input screen 105, or the like. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A user terminal comprising:
a content providing unit configured to display a text-type advertisement content on a lock screen according to an input of a user;
a gaze tracking unit configured to acquire, through a photographic device, a face image of the user and a vector representing a direction in which a face of the user is facing, and track a gaze of the user from the face image and the vector to determine whether the user has read the text-type advertisement content;
a reward providing unit configured to display a button, which is different from the text-type advertisement content, for confirming a reward when it is determined that the user has read the text-type advertisement content and to provide the reward when the user gazes at the button for a set period of time or touches the button; and
a learning data collection unit configured to collect learning data that includes position information of the button and the face image photographed when the user gazes at the button for a set period of time or touches the button,
wherein the gaze tracking unit is configured to train a deep learning model by inputting the learning data to the deep learning model and track the gaze of the user by using the trained deep learning model.

2. The user terminal of claim 1, wherein the reward providing unit is configured to unlock the lock screen when it is determined that the user has read the text-type advertisement content.

3. The user terminal of claim 1, wherein the content providing unit is configured to operate the photographing device as the text-type advertisement content is displayed.

4. A method of providing a text-reading based reward-type advertisement service, comprising:
displaying, at a content providing unit, a text-type advertisement content on a lock screen according to an input of a user;
acquiring, at a gaze tracking unit, through a photographic device, a face image of the user and a vector representing a direction in which a face of the user is facing;
tracking, at the gaze tracking unit, a gaze of the user from the face image and the vector to determine whether the user has read the text-type advertisement content;
displaying, at a reward providing unit, a button, which is different from the text-type advertisement content, for confirming a reward when it is determined that the user has read the text-type advertisement content;
providing, at a reward providing unit, the reward when the user gazes at the button for a set period of time or touches the button; and
collecting learning data that includes position information of the button and the face image photographed when the user gazes at the button for a set period of time or touches the button, wherein the tracking of the gaze of the user comprises training a deep learning model by inputting the learning data to the deep learning model and tracking the gaze of the user by using the trained deep learning model.

5. The method of claim 4, further comprising unlocking, at the reward providing unit, the lock screen when it is determined that the user has read the text-type advertisement content.

6. The method of claim 4, further comprising operating, at the content providing unit, the photographing device as the text-type advertisement content is displayed.

* * * * *